W. V. TURNER.
DOUBLE PRESSURE PUMP GOVERNOR.
APPLICATION FILED APR. 11, 1911.
1,074,224.
Patented Sept. 30, 1913.
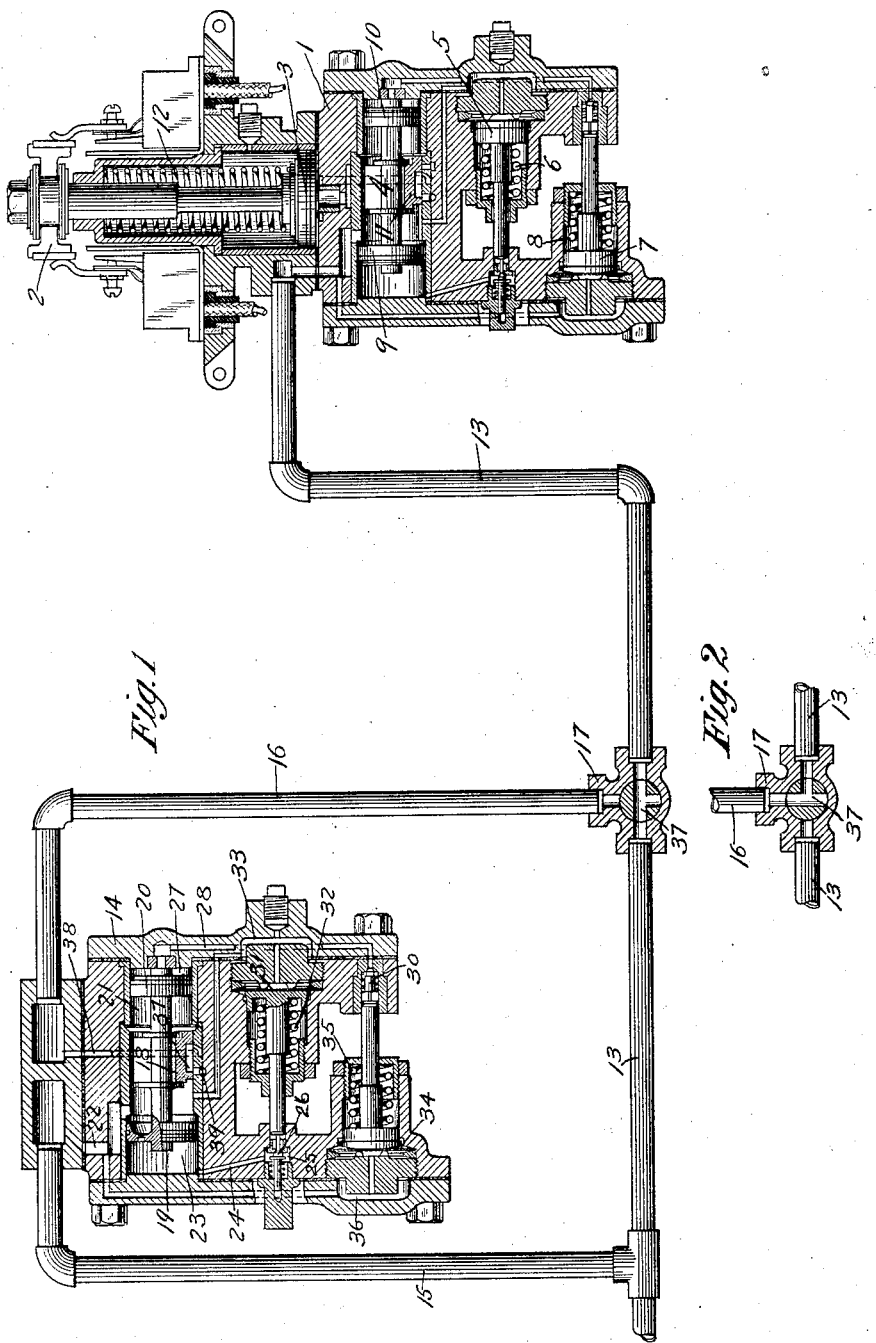
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

DOUBLE-PRESSURE PUMP-GOVERNOR.

1,074,224.

Specification of Letters Patent. Patented Sept. 30, 1913.

Application filed April 11, 1911. Serial No. 620,472.

*To all whom it may concern:*

Be it known that I, WALTER V. TURNER, a citizen of the United States, residing at Edgewood, in the county of Allegheny and State of Pennsylvania, have invented new and useful Improvements in Double-Pressure Pump-Governors, of which the following is a specification.

This invention relates to pump governors adapted to operate at a minimum and maximum degree of pump pressure for respectively cutting the pump into and out of action.

Where equipment is employed in different classes of service, such as passenger and freight service, different maximum and minimum degrees of pressure may be desired for one class of service than is required in the other class of service, and the principal object of my invention is to provide means for controlling the pump at one time according to one degree of maximum and minimum pump pressure and at another time according to a different degree of maximum and minimum pump pressure, the broad invention being covered in by co-pending application, Serial No. 620,471, filed April 11, 1911.

In the accompanying drawing, Figure 1 is a sectional view of an electric pump governor, with my improvement applied thereto and Fig. 2 a detail view of the controlling cock.

While the particular pump governor shown in the drawing is known as the J type, such as covered in my prior Patent No. 879,699, dated February 18, 1908, it will be understood that my improvement may be employed in connection with various other types of pump governors.

According to Fig. 1, the pump governor 1 may comprise a casing, a switch 2 for controlling the pump motor circuit, a piston 3 for actuating the switch, a valve mechanism 4 for controlling the admission and release of fluid to and from the switch piston 3, a maximum pressure regulating valve device 5, subject to the opposing pressures of an adjustable spring 6 and the pump pressure, and a minimum pressure regulating valve device 7, subject to the opposing pressures of an adjustable spring 8 and the pump pressure.

The valve mechanism 4 comprises two pistons heads 9 and 10 for operating the valve 11 which controls the admission and release of fluid to and from the switch piston 3 and the regulating valve device 5 is adapted when the pump pressure increases to the predetermined maximum degree to vent fluid from the piston head 9 and thereby operate the valve 11 to supply fluid to the switch piston 3, said piston being thereupon actuated to open the pump motor switch 2. When the pump pressure decreases to the predetermined minimum degree, the regulating valve device 7 operates to vent air from the piston head 10, thereby actuating the valve 11 to release fluid from the switch piston 2 and cause the spring 12 to close the switch 2. Fluid for controlling the operation of the pump governor is supplied thereto by way of a pipe 13 which is connected to the reservoir or receptacle into which the pump compresses fluid.

According to my improvement, a valve mechanism is provided comprising a casing 14 having a pipe 15 connected to the pump reservoir pipe 13 and a pipe 16 connected to a controlling cock 17 located in the pipe 13.

Within the casing 14 is mounted a valve device comprising a valve 18 and connected piston heads 19 and 20 for operating said valve. The valve chamber 21 intermediate the piston heads 19 and 20 is in open communication through passage 22 with pipe 15 and chamber 23 adjacent the outer face of piston head 19 is connected by passage 24 to a chamber 25 controlled by a regulating valve 26. The piston chamber 27 at the outer face of piston head 20 is connected to passage 28 controlled by a regulating valve 30.

The regulating valve 26 is operated by a movable diaphragm 31, subject on one side to the pressure of an adjustable spring 32 and on the opposite side to pump pressure supplied thereto through a passage 33.

The regulating valve 30 is controlled by a movable diaphragm 34, subject on one side to the pressure of an adjustable spring 35 and on the opposite side to pump pressure supplied thereto through a passage 36.

In operation, with the controlling cock 17 in the position shown in Fig. 1, fluid at pump pressure is supplied through the port 37 to the pump governor and said governor is then operated in the usual manner according to the maximum and minimum degrees of pump pressure for which the regulating valve devices 5 and 7 may be adjusted.

If it is desired to regulate the pump pressure according to a different maximum and minimum degree, the controlling cock 17 is turned to the position shown in Fig. 2, in which the reservoir side of pipe 13 is cut off from the governor and the pipe 16 is connected to the governor side of the pipe 13.

By way of example, assume that the maximum and minimum regulating pressures of the main pump governor 1 are 100 pounds and 85 pounds respectively and that the higher maximum and minimum pressures desired are 140 and 125 pounds respectively, then the maximum regulating spring 32 is adjusted at 140 pounds and the minimum regulating spring 35 is adjusted at 125 pounds.

The operation will now be as follows: With the valve 18 in the position shown in Fig. 1, cavity 37 connects passage 38, leading to pipe 16, with an exhaust port 39, so that there is no fluid pressure on the regulating valve devices of the governor 1 and the switch 2 is therefore cut in and the pump operates to compress fluid. When the pump pressure has increased to 140 pounds at which the maximum regulating spring 32 is adjusted, the diaphragm 31 operates the valve 26 and fluid is vented from piston chamber 23 through the passage 24. The piston heads 19 and 20 being provided with equalizing ports for permitting fluid to equalize from the valve chamber 21 to the piston chambers 23 and 27, the fluid pressure in piston chamber 27 will now be unbalanced and the controlling valve device thereupon shifted so that the valve 18 uncovers passage 38 and permits fluid to flow to pipe 16 and thence through pipe 13 to the pump governor 1. The fluid at high pressure thus admitted to the regulating valve device 5 promptly operates the same to thereby vent fluid from the piston head 9, so that the valve 11 is actuated to supply fluid to the switch piston 3. Said switch piston then opens the switch 2 and stops the pump. When the pump pressure falls to the minimum pressure of 125 pounds, at which the regulating spring 35 is adjusted, the valve 30 is actuated by the diaphragm 34 to vent fluid from the piston head 20 through the passage 28, and the valve 26 being closed at this pressure, the fluid previously equalized into the chamber 23 operates the piston 19, and the valve 18 is shifted to its position for connecting the passage 38 with exhaust port 39. Fluid is thus vented from the pipe 13 and the diaphragms of the regulating devices 5 and 7, so that the passage for venting fluid from piston 9 is closed by the regulating valve device 5, while the regulating valve device 7 operates to vent fluid from the piston head 10. The fluid pressure on the piston head 9 then operates the valve mechanism 4 and the valve 11 is shifted to the position for venting fluid from the switch piston 3. The release of fluid from said piston thereupon permits the spring 12 to shift the same and close the switch 2 so as to cut the pump into action. It will now be evident that when the cock 17 is turned to one position fluid at pump pressure is admitted to the governor 1 and the latter then operates in the usual manner to control the pump, but when the cock 17 is turned to its other position, the valve mechanism 14 is effective to control the pump according to the higher maximum and minimum pressures for which the same is adjusted.

Having now described my invention, what I claim as new and desire to secure by Letters Patent is:—

1. The combination with a pump governor normally operating at a predetermined maximum degree of pump pressure for cutting the pump out of action and at a predetermined minimum degree of pump pressure for cutting the pump into action, of a valve mechanism operating at higher maximum and minimum pump pressures for controlling the supply of operating fluid to said governor to thereby cause the governor to operate at predetermined maximum and minimum degrees of pump pressure higher than the normal.

2. The combination with a pump governor comprising a pump controlling device and a valve mechanism operating at a predetermined maximum degree of pump pressure for actuating said controlling device to cut the pump out of action and at a predetermined minimum degree of pump pressure for cutting the pump into action, of a valve mechanism operating at higher maximum and minimum degrees of pump pressure and adapted to be cut in for controlling the pump governor valve mechanism to thereby cause the pump controlling device to operate at higher maximum and minimum degrees of pump pressure.

3. The combination with a pump governor adapted at a predetermined maximum degree of pump pressure to cut the pump out of action and at a predetermined minimum degree of pump pressure to cut the pump into action, of a valve mechanism operating at a higher maximum degree of pump pressure to supply operating fluid to effect the operation of the pump governor at said higher maximum pressure and operating at a higher minimum degree of pump pressure to release fluid from said governor to effect the operation thereof at said higher minimum degree of pump pressure.

4. The combination with a pump governor adapted at a predetermined maximum degree of pump pressure to cut the pump out of action and at a predetermined minimum degree of pump pressure to cut the pump into action, of a valve mechanism for controlling said pump governor according to a higher maximum and minimum degree of pump pressure, comprising a valve for supplying and releasing fluid to and from said pump governor, a piston device for operating said valve, a maximum pressure regulating device governed by the pump pressure and a minimum pressure regulating device governed by the pump pressure for controlling the operation of said piston device.

5. The combination with a pump governor adapted at a predetermined maximum degree of pump pressure to cut the pump out of action and at a predetermined minimum degree of pump pressure to cut the pump into action, of a valve mechanism operating according to a higher degree of maximum and minimum pump pressure for controlling the admission and release of fluid to and from said pump governor, and a cock adapted in one position to supply fluid at pump pressure to said pump governor and in another position to open communication from said valve mechanism for supplying and releasing fluid to and from the pump governor.

6. The combination with a pump governor normally operated by fluid at a predetermined maximum degree of pump pressure to cut the pump out of action and at a predetermined minimum degree of pump pressure to cut the pump into action, of a valve mechanism operated at higher predetermined degrees of maximum and minimum pump pressures for also controlling the supply of operating fluid to said governor.

7. The combination with a pump governor normally operated by fluid at a predetermined maximum degree of pump pressure to cut the pump out of action and at a predetermined minimum degree of pump pressure to cut the pump into action, of a valve mechanism operated at higher predetermined degrees of maximum and minimum pump pressures for also controlling the supply of operating fluid to said governor, and a cock adapted in one position to connect said governor directly with fluid at pump pressure and in another position to said valve mechanism.

In testimony whereof I have hereunto set my hand.

WALTER V. TURNER.

Witnesses:
A. M. CLEMENTS,
S. W. KEEFER.

---

Copies of this patent may be obtained for five cents each, by addressing the "Commissioner of Patents, Washington, D. C."